J. F. O'CONNOR.
FRICTION SHOCK ABSORBING MECHANISM.
APPLICATION FILED MAR. 25, 1920.
1,386,795.
Patented Aug. 9, 1921.
2 SHEETS—SHEET 2.
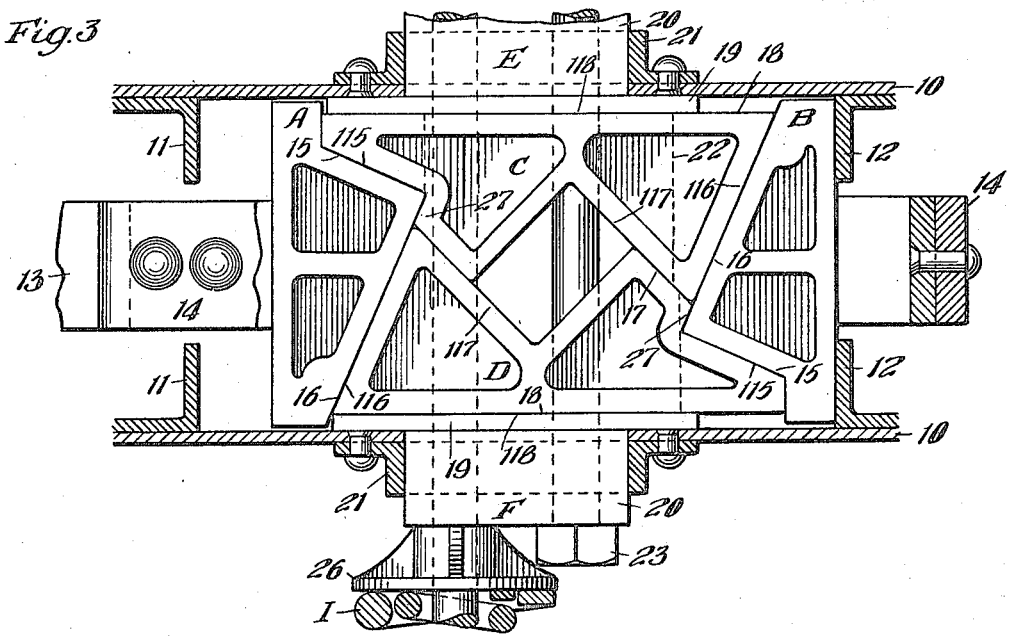
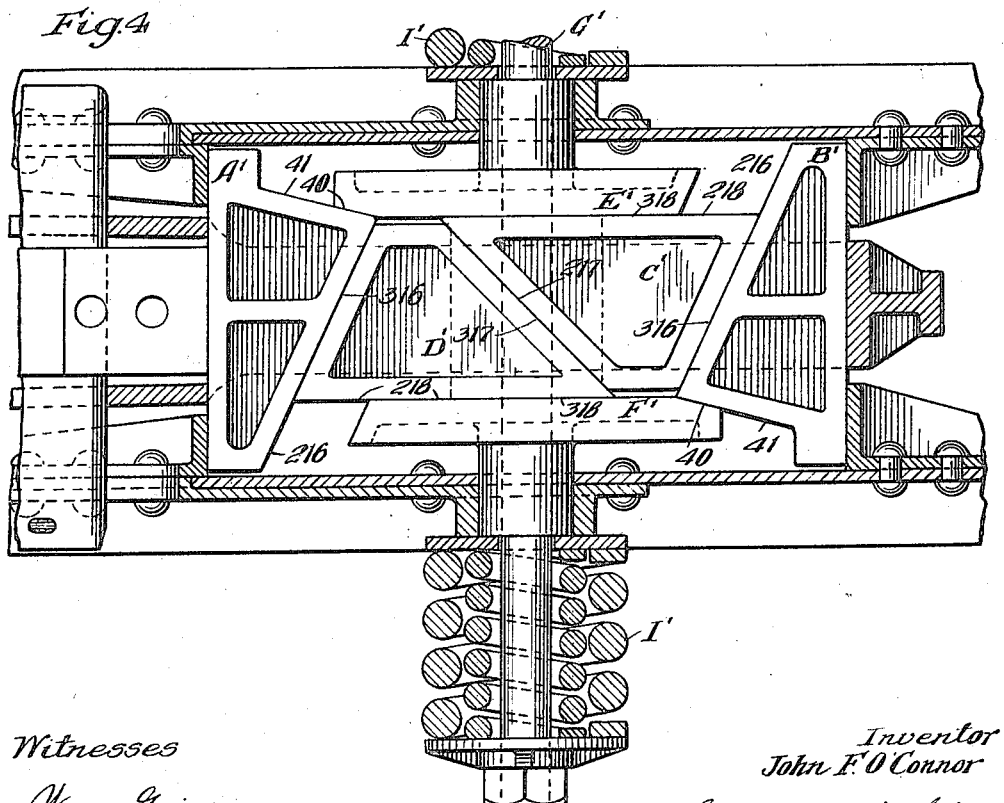
Witnesses
Wm. Geiger
Inventor
John F. O'Connor
By Geo. I. Haight
His Atty.

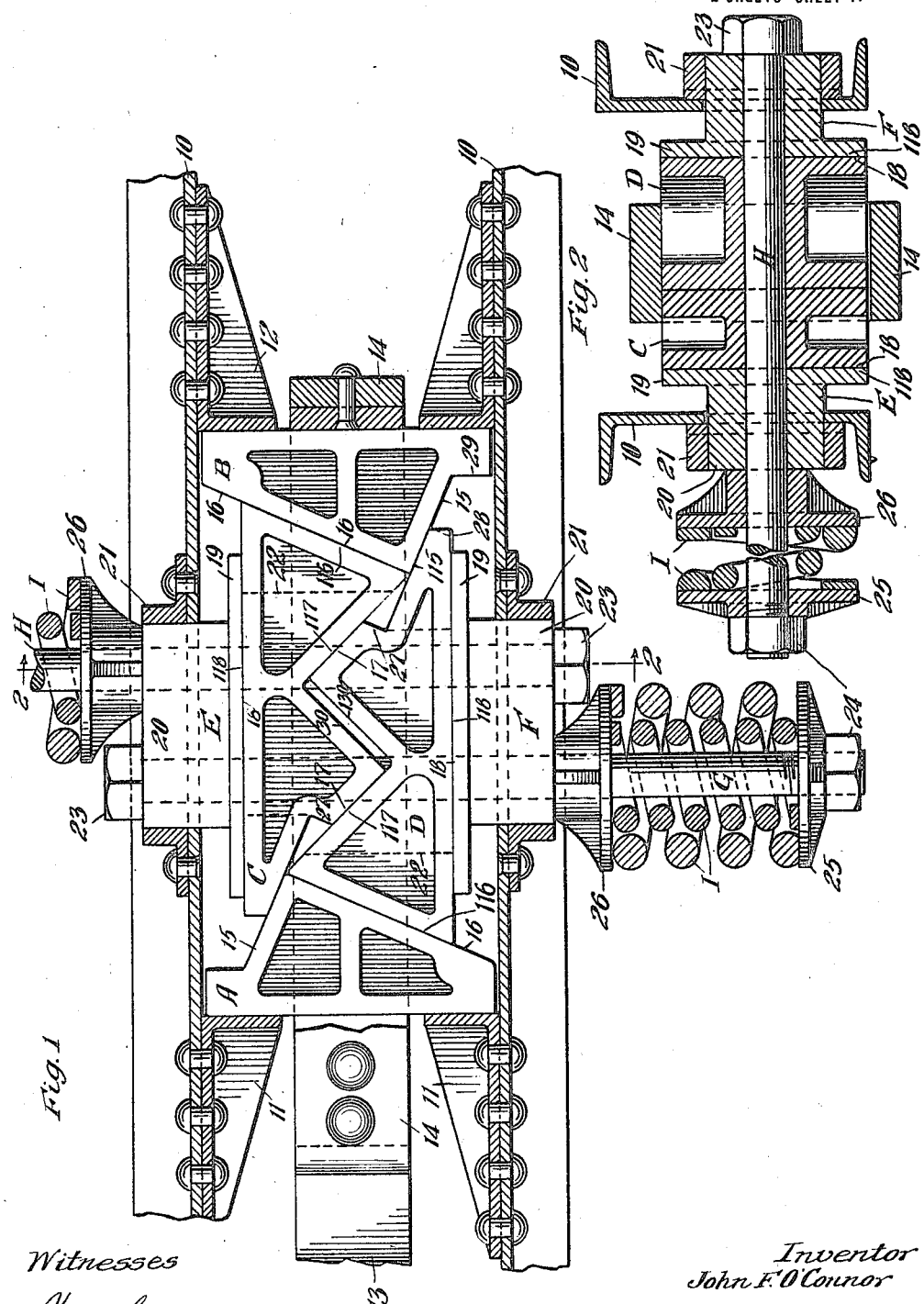

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,386,795.   Specification of Letters Patent.   Patented Aug. 9, 1921.

Application filed March 25, 1920. Serial No. 368,671.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

One object of this invention is to provide a friction shock absorbing mechanism more particularly adapted for railway draft riggings and wherein is obtained high frictional capacity and large wearing areas.

Another object of my invention is to provide a friction shock absorbing mechanism consisting of relatively few friction elements proper and each of which may be made in the form of a casting and wherein a greater number and greater area of coöperating sets of friction faces is obtained than heretofore in any friction shock absorbing mechanism employing a similar number of parts.

The invention furthermore consists in the improvements in the parts and devices and in the novel combinations of the parts and devices herein shown, described and made the subject matter of claims.

In the drawings forming a part of this specification, Figure 1 is a longitudinal, horizontal sectional view of a portion of a railway draft rigging, showing my improvements in connection therewith, the position of the parts corresponding to the full release or normal condition of the mechanism. Fig. 2 is a vertical sectional view corresponding substantially to the line 2—2 of Fig. 1. Fig. 3 is a view similar to Fig. 1 but illustrating the position assumed by the parts at the end of the compressive stroke. And Fig. 4 is a view corresponding to Fig. 1 illustrating a somewhat different embodiment of the invention.

In said drawing, and referring first to Figs. 1, 2 and 3, 10—10 denote channel shaped center or draft sills of a railway car to the inner faces of which are secured front stop lugs 11 and rear stop lugs 12. As will be understood by those skilled in the art, any one of a number of well known stop-acting means may be employed to perform the function of the said lugs 11 and 12. A portion of a drawbar shank is indicated at 13, the same being operatively connected to the shock absorbing mechanism proper by a yoke 14 of well known form.

In carrying out my invention, I employ a front combined follower and wedge A; a rear combined follower and wedge B; two friction shoes C and D; laterally movable friction members E and F; a pair of longitudinally staggered transversely extending bolts G and H; and springs I—I mounted on said bolts.

In actual practice, each member A and B will have the follower and wedge thereof cast integrally in the interests of economy, although, as will be understood by those skilled in the art, the spirit of the invention would not be departed from if the wedges were formed as elements separate from the followers proper. As shown, the members A and B are of like construction and each includes a follower proper and a wedge on its inner face, said wedge having a friction face 15 extending at a relatively acute angle with respect to the center line of draft and a second friction face 16 extending at a relatively blunter angle with respect to the center line of draft. The result of the formation of the friction wedge faces 15 and 16, as above described, is to render the wedge unsymmetrical with respect to the center line of draft, that is, the intersection of the faces 15 and 16 will be to one side of the longitudinal center of the mechanism. As clearly shown in Fig. 1, the members A and B are oppositely arranged, that is, the apex of one wedge is on one side of the longitudinal center line and the apex of the other wedge on the opposite side of the longitudinal center line of the mechanism.

The shoes C and D are of like construction, preferably in the form of castings, and each is provided with a friction face 116 at one end and another friction face 115 at the opposite end, the same being adapted to engage and coöperate with the friction faces 16 and 15, respectively, of the end members A and B. In addition, the friction shoes C and D are provided at points intermediate the members A and B with a pair of coöperating sets of friction faces 17 and 117. The shoes C and D are furthermore provided on their outer sides with flat longitudinally extending friction faces 18—18 adapted to coöperate with corresponding longitudinally extending friction faces 118—118 on the inner sides of the friction members E and F.

The friction members E and F are of similar construction, preferably in the form of castings, and each has an inner flange-like section 19 adapted to provide for the friction faces 118 and an outwardly extended substantially rectangular heavy boss 20 which passes through a corresponding opening in the draft sill and through a reinforcing and guiding casting 21 secured to the outer side of the draft sill. With this construction, it is evident that the friction members E and F, while permitted lateral movement horizontally, are restricted or prevented from moving lengthwise of the sills.

The bolts G and H are staggered lengthwise of the sills, each of said bolts passing through suitable alined openings in the friction members E and F and in the shoes C and D; the openings in the shoes C and D being longitudinally elongated as indicated at 22—22 in order to provide for longitudinal movement of said shoes C and D with respect to the bolts which are held stationary. The bolts G and H are not only staggered as above indicated but are oppositely arranged so that the head 23 of one bears on the outer side of one friction member and the head 23 of the other bolt bears on the outer side of the opposite friction member. The extended ends of the bolts G and H are provided with nuts 24 at their outer ends and washers 25, the springs I—I being mounted on said bolts between said washers 25 and inner washers or followers 26, the latter being slidable on the bolt G and H, as will be understood. With this particular arrangement of bolts it is evident that each spring will be compressed a distance equal to twice the lateral movement of either shoe C and D.

Each shoe C and D is provided with a shoulder 27 adapted to engage the adjacent end wedge to limit the action of the mechanism and preferably each shoe C and D will also be provided with a blunt end as indicated at 28 adapted to engage a coöperating shoulder 29 on the follower for the same purpose. It will also be noted from an inspection of Fig. 1 that a small amount of clearance is left between the faces 30 and 130 of the shoes which is to provide for any wear on the parts and consequently permit the shoes to approach each other slightly to compensate therefor.

From the preceding description, considered in connection with the drawings, it will be noted that the friction faces 16—16 of the wedges are parallel as are also the faces 118 of the members E and F. These four friction faces form, in effect, a parallelogram of which two sides are parallel to the center line of draft and the other two at an angle thereto so that the parallelogram is other than a rectangle. With this construction, as the end wedges are forced toward each other either under buff or draft, the said parallelogram will contract lengthwise but will expand transversely. By the use of this arrangement of friction faces, I am enabled to introduce the additional friction faces 17 and 117 on the shoes C and D which I believe to be broadly new with me and an important advance in the art. Said friction faces 17 and 117, it will be noted, extend in a direction which more or less corresponds to the shorter diagonal of said parallelogram and in actual practice a definite relation will be established between the three sets of friction faces 15 and 115; 16 and 116; and 17 and 117, said relation being such that, as the shoes C and D are spread apart laterally and also shift lengthwise, the faces 17 and 117 will always remain in frictional engagement. As will be apparent from an inspection of Fig. 3, upon relative approach of the followers—as for instance, when the front follower is forced rearwardly, the two shoes C and D, while being spread apart at a uniform rate from the center line of the mechanism will, nevertheless, be shifted longitudinally at different rates. For instance, when the gear is compressed in the manner shown in Fig. 3, the shoe C will have moved rearwardly a much lesser distance than the shoe D and this is because of the unsymmetrical arrangement of the wedge faces 15 and 16. It is because of this different rate of longitudinal travel of the shoes C and D that I am enabled to retain the friction faces 17 and 117 in frictional engagement throughout the compressive stroke.

Friction will furthermore be generated between the shoes C and D and the members E and F due to the longitudinal travel of the shoes C and D and, as will be understood, the lateral separation of the shoes C and D is yieldingly resisted by the springs, acting through the bolts G and H.

In manufacturing the parts, the members A, B, C and D will preferably be cored as indicated most clearly in Fig. 1 in order to save metal and make the gear as light as possible while retaining the necessary strength. As will be obvious to those skilled in the art, many changes may be made in the details of construction without departing from the spirit of the invention, as for instance in the arrangement of the bolts which may be consolidated into a single bolt as shown in Fig. 4, or which may be staggered vertically instead of horizontally or which may be extended vertically instead of transversely through the sills. In the latter connection, a corresponding change in the arrangement of wedges and friction shoes would be required although the principle of operation would be identical.

Referring next to the construction shown in Fig. 4. In this construction end combined followers and wedges A' and B' are employed substantially the same as those shown in Fig. 1. Said members A' and B' are provided with parallel opposed friction faces 216—216 at an angle to the center line of the mechanism and the two shoes C' and D' are provided with coöperating end friction faces 316—316. In this construction, also the shoes C' and D' are provided with coöperating engaged friction faces 217 and 317 extending in the same general direction as the friction faces 17 and 117. Laterally movable friction members E' and F' are provided, the same having longitudinally extending friction faces 318—318 adapted to coöperate with corresponding longitudinally extending friction faces 218—218 on the shoes C and D.

In the construction of Fig. 4 a single bolt G' is employed which is extended at both ends beyond the draft sills and on which are mounted two springs I'—I', as clearly indicated. Said members E' and F' are prevented from longitudinal movement with respect to the sills by means corresponding to those shown and described with respect to the other construction.

In the arrangement of Fig. 4, however, it will be noted that the shoes C' and D' engage but a single wedge and the same do not have the engagement at both ends as in the case of the shoes C and D. The parallelogram arrangement of friction faces is still retained in the sets of friction faces 216—316; and 218—318 so that the maintenance of the friction faces 217 and 317 in engagement with each other obtains throughout the compressive stroke. The members E' and F' may be beveled at opposite ends as indicated at 40—40 in order to engage with the inclined faces 41—41 of the members A' and B', when the parts are in normal or full released position so as to insure the proper centering of all of the friction elements.

I have herein shown and described what I now consider the preferred manner of carrying out the invention but the same is merely illustrative and not by way of limitation and I contemplate all changes and modifications that come within the scope of the claims appended hereto.

I claim:

1. In a friction shock absorbing mechanism, the combination with a pair of members relatively lineally movable toward and from each other, said members having parallel opposed friction faces disposed at an angle other than a right angle to said line of relative movement; of a pair of friction shoes interposed between said members, each shoe having a friction face at one end thereof extending at the same angle to said line of relative movement as the friction faces of said members and in engagement with one of the latter, said shoes having also coöperating engaging friction faces intermediate said members, the said coöperating friction faces of the shoes extending at an angle other than a right angle to said line of relative movement and at an acute angle with respect to said friction faces of said members; and spring means acting upon said shoes in a direction at right angles to said line of relative movement and perpendicular to the planes of said friction faces, the friction shoes, upon relative approach of said members, being shifted transversely of the line of movement of said members and friction being generated between said members and the shoes, and between the shoes.

2. In a friction shock absorbing mechanism, the combination with a pair of end friction members relatively lineally movable toward and from each other; of a pair of side friction members relatively lineally movable toward and from each other, the members of each of said pairs being provided with parallelly extending opposed inner friction faces, the friction faces of one pair extending at an angle other than a right angle to the friction faces of the other pair to form, in effect, a parallelogram of friction faces other than a rectangle a plurality of friction shoes disposed within said parallelogram, said shoes having friction faces engaging with the friction faces of all of said members and provided also with friction faces coöperable with each other, the coöperable friction faces of the shoes extending in the general direction of the shorter diagonal of said parallelogram; means adapted to actuate one of said pairs of members to effect relative approach thereof; and means for yieldingly resisting relative separation of the other of said pairs of members upon relative approach of said members actuated by said first named means.

3. In a railway draft rigging, the combination with draft sills, drawbar, yoke-acting means, and stop-acting means; of a pair of end members relatively movable in the line of draft, said members having opposed parallel friction faces extending at an angle other than a right angle to the line of draft; a pair of friction shoes interposed between said members, each shoe having a friction face at one end thereof extending at the same angle to the line of draft and in engagement with one of said end members, said shoes having also coöperating engaging friction faces intermediate said end members, said coöperating friction faces on the shoes extending at an acute angle with respect to the friction faces of said end members and at an angle other than a right angle to the line of draft; and spring means acting upon said shoes in a direction transverse to the line of draft whereby, upon actuation of said end members, the friction will be generated between said members and the shoes and also between the shoes.

4. In a friction shock absorbing mechanism adapted for railway draft riggings, the combination with a pair of friction members relatively movable toward and from each other parallel to the line of draft, said members having opposed parallel friction faces extending at an angle other than a right angle to the line of draft; of a pair of friction shoes interposed between said members, said shoes being relatively movable toward and from each other at right angles to the line of draft, each shoe having a friction face at one end engaging the friction face of one of said end members, said shoes having also coöperating engaging friction faces intermediate said members and extending at an angle other than a right angle to the line of draft; and spring means co-acting with said shoes to yieldingly resist relative separation thereof upon relative approach of said members.

5. In a friction shock absorbing mechanism adapted for use in a railway draft rigging, the combination with a pair of members relatively movable toward and from each other parallel to the line of draft, said members having opposed parallel friction faces extending at an angle other than a right angle to said line of draft; of a pair of friction shoes interposed between said members, said shoes being laterally movable horizontally relatively toward and from each other, each shoe having an end friction face coöperable with a friction face of one of said members, said shoes having also coöperating engaging friction faces intermediate said members, the said coöperating friction faces of the shoes also extending at an angle other than a right angle to the line of draft and at an acute angle with respect to said friction faces of said members; and spring means acting in a horizontal direction to yieldingly resist relative separation of said friction shoes.

6. In a railway draft rigging, the combination with draft sills and stop-acting means; of front and rear followers; end wedges, each end wedge being formed integrally with the follower, said wedges having opposed parallel friction faces extending at an angle other than a right angle to the line of draft; a pair of friction shoes interposed between said wedges, each shoe having a friction face at one end thereof extending at the same angle to the line of draft as said friction faces of said wedges and in engagement with one of the latter, said shoes also having coöperating engaging friction faces intermediate their ends, the said coöperating friction faces of the shoes extending at an angle other than a right angle to the line of draft and at an acute angle with respect to said faces of the wedges; and spring means co-acting with said shoes to yieldingly resist relative separation thereof upon relative approach of said followers and end wedges.

7. In a friction shock absorbing mechanism, the combination with a pair of members relatively lineally movable toward and from each other, said members having parallel opposed friction faces disposed at an angle other than a right angle to said line of relative movement; of a pair of friction shoes interposed between said members, each shoe having a friction face at one end thereof in engagement with a corresponding face of one of said members, said shoes having also coöperating engaging friction faces intermediate said members, said coöperating friction faces of the shoes extending at an angle other than a right angle to said line of relative movement; and means for yieldingly resisting relative separation of said shoes, said means including, a rod extending through the shoes at right angles to said line of relative movement and a spring mounted on said rod.

8. In a railway draft rigging, the combination with the draft sills and stop-acting means: of a pair of end members relatively movable in the line of draft, said members having parallel opposed friction faces disposed at an angle other than a right angle to said line of draft; a pair of friction shoes interposed between said end members, said shoes being relatively laterally movable horizontally and each provided with a friction face at one end thereof coöperable with a corresponding face of one of said end members, said shoes having also coöperating engaging friction faces intermediate said end members; and means for yieldingly resisting relative separation of said shoes including, a rod extending horizontally through said shoes and draft sills and a spring mounted on said rod.

9. In a railway draft rigging, the combination with the draft sills and stop-acting means; of a pair of end members relatively movable in the line of draft, said members having parallel opposed friction faces disposed at an angle other than a right angle to said line of draft; a pair of friction shoes interposed between said end members, said shoes being relatively laterally movable horizontally and each provided with a friction face at one end thereof coöperable with a corresponding face of one of said end members, said shoes having also coöperating engaging friction faces intermediate said end members; and means for yieldingly resisting relative separation of said shoes including, a rod extending horizontally through said shoes and draft sills and a spring mounted on said rod, said means being held against movement longitudinally of the sills.

10. In a railway draft rigging, the combination with draft sills and stop-acting means; of a pair of end friction members relatively movable in the line of draft; a second pair of friction members extending lengthwise of the sills and relatively movable toward and from each other at right angles to the line of draft, the members of each of said pairs being provided with parallelly extending opposed inner friction faces, the friction faces of one pair extending at an angle other than a right angle to the friction faces of the other pair to form, in effect, a parallelogram of friction faces other than a rectangle; means preventing movement of said second pair of friction members longitudinally of the sills; a plurality of friction shoes disposed within said parallelogram, said shoes having friction faces engaging with the friction faces of all of said members and provided also with friction faces coöperable with each other, said coöperable friction faces of the shoes extending in the general direction of the shorter diagonal of said parallelogram; means for actuating said end pair of friction members; and means for yieldingly resisting relative separation of the second named pair of members.

11. In a railway draft rigging, the combination with the draft sills and stop-acting means; of a pair of end friction members relatively movable toward and from each other in the line of draft, said end friction members having friction faces extending at an angle other than a right angle relatively to the center line of draft, the stop-acting means limiting the separation of said members; a pair of side friction members relatively movable toward and from each other transversely of the sills, said members having friction faces extending parallel to the sills; spring means arranged to yieldingly resist lateral separation of said last named friction members; means preventing longitudinal movement of said last mentioned friction members; and friction shoes disposed between the end and side friction members, said shoes having friction faces coöperable with the faces of the side and end members and provided also with friction faces coöperable with each other.

12. In a railway draft rigging, the combination with the draft sills and stop-acting means; of front and rear follower-acting means; a pair of friction shoes located between said follower-acting means, said friction shoes having engaging friction faces adapting the shoes to slide relatively to each other, said shoes and follower-acting means having coöperating engaging friction faces so arranged that, upon relative approach of said follower-acting means, one shoe will travel parallel to the center line of draft a greater distance than the other shoe relative to the same follower-acting means; and spring means co-acting with said shoes to yieldingly resist relative sliding of the one upon the other when the follower-acting means are actuated to approach each other.

13. In a railway draft rigging, the combination with the draft sills and stop-acting means; of front and rear end wedges having friction faces extending at an angle other than a right angle relative to the center line of draft; a pair of friction shoes interposed between said end wedges and having friction faces coöperable with the latter, said shoes being provided also with coöperating friction faces; a pair of longitudinally extending friction members having longitudinally extending opposed friction faces, said shoes having corresponding coöperating longitudinally extending friction faces; and means for yieldingly resisting relative separation of said shoes and relative movement between the shoes and said longitudinally extending friction members, said means including a bolt extending at right angles to the line of draft and a spring thereon.

14. In a railway draft rigging, the combination with the draft sills and stop-acting means; of front and rear end wedges having friction faces extending at an angle other than a right angle relative to the center line of draft; a pair of friction shoes interposed between said end wedges and having friction faces coöperable with the latter, said shoes being provided also with coöperating friction faces; a pair of longitudinally extending friction members having longitudinally extending opposed friction faces, said shoes having corresponding coöperating longitudinally extending friction faces; and means for yieldingly resisting relative separation of said shoes and relative movement between the shoes and said longitudinally extending friction members, said means including a bolt extending at right angles to the line of draft and a spring thereon, said bolt extending through openings provided in said shoes, longitudinally extending friction members and the sills.

15. In a railway draft rigging, the combination with draft sills and stop-acting means; of front and rear end wedges, each of said wedges having two faces inclined with respect to the center line of draft, the angle between said faces and the center line of draft being different and the two end wedges being oppositely disposed with respect to the center line of draft; a pair of friction shoes interposed between said end wedges, each shoe having a friction face at one end coöperable with one friction face of one wedge and a friction face at its other end coöperable with a different friction face of the other end wedge, said shoe being provided also with coöperating engaging friction faces; and means for yieldingly resisting relative separation of the friction shoes in a direction at right angles to the center line of draft.

16. In a railway draft rigging, the combination with the draft sills and stop-acting means; of end wedges, said wedges being of like construction but oppositely and unsymmetrically arranged with respect to the center line of draft; friction shoes each having friction faces coöperable with a friction face of each wedge; and means for yieldingly resisting relative separation of said shoes in a direction transverse to the line of draft upon relative approach of said end wedges.

17. In a railway draft rigging, the combination with the draft sills and stop-acting means; of end wedges, said wedges being of like construction but oppositely and unsymmetrically arranged with respect to the center line of draft; friction shoes each having friction faces coöperable with a friction face of each wedge; and means for yieldingly resisting relative separation of said shoes in a direction transverse to the line of draft upon relative approach of said end wedges, said friction shoes having also coöperable friction faces.

18. In a railway draft rigging, the combination with draft sills and stop-acting means; of front and rear followers each provided on its inner side with a wedge, said wedge being unsymmetrical with respect to the center line of draft and oppositely arranged with respect thereto; a pair of laterally movable friction members having inner opposed friction faces parallel to the draft sills; spring means yieldingly resisting lateral separation of said friction members; and friction shoes interposed between said wedges and said laterally movable friction members, said shoes having friction faces coöperable with said wedges and friction members.

19. In a railway draft rigging, the combination with draft sills and stop-acting means; of front and rear followers each provided on its inner side with a wedge, said wedges being unsymmetrical with respect to the center line of draft and oppositely arranged with respect thereto; a pair of laterally movable friction members having inner opposed friction faces parallel to the draft sills; spring means yieldingly resisting lateral separation of said friction members; and friction shoes interposed between said wedges and said laterally movable friction members, said shoes having friction faces coöperable with said wedges and friction members, said shoes having also coöperating friction faces.

20. In a railway draft rigging, the combination with draft sills and stop-acting means; of front and rear followers each provided on its inner side with a wedge, said wedges being unsymmetrical with respect to the center line of draft and oppositely arranged with respect thereto; a pair of laterally movable friction members having inner opposed friction faces parallel to the draft sills; spring means yieldingly resisting lateral separation of said friction members; and friction shoes interposed between said wedges and said laterally movable friction members, said shoes having friction faces coöperable with said wedges and friction members, said shoes having also coöperating friction faces, said means for yieldingly resisting lateral separation of said friction members including a bolt extending transversely through the said friction members, shoes and sills, and a spring mounted on said bolt.

In witness that I claim the foregoing I have hereunto subscribed my name this 28th day of Feb. 1920.

JOHN F. O'CONNOR.

Witness:
CARRIE GAILING.